United States Patent [19]

Decker et al.

[11] Patent Number: 5,074,023

[45] Date of Patent: Dec. 24, 1991

[54] METHOD AND APPARATUS FOR APPLYING A HANDLE COVER

[75] Inventors: Richard B. Decker, Vermilion; Joseph Hummel, Amherst, both of Ohio

[73] Assignee: Bettcher Industries, Inc., Birmingham, Ohio

[21] Appl. No.: 552,576

[22] Filed: Jul. 13, 1990

Related U.S. Application Data

[62] Division of Ser. No. 106,247, Oct. 7, 1987, Pat. No. 4,941,232.

[51] Int. Cl.[5] .............................................. B23P 11/02

[52] U.S. Cl. ........................................ 29/450; 29/446; 29/451; 29/464; 29/235; 29/242

[58] Field of Search ................. 29/446, 450, 464, 235, 29/242, 451

[56] References Cited

U.S. PATENT DOCUMENTS

| | | | |
|---|---|---|---|
| 2,038,840 | 4/1936 | Hall | 29/235 |
| 2,655,963 | 10/1953 | Dell | 81/492 |
| 2,840,896 | 7/1958 | Edwards | 29/450 |
| 4,185,375 | 1/1980 | Brown | 29/450 |
| 4,466,166 | 8/1984 | Hogarth | 29/450 |
| 4,685,189 | 8/1987 | Palmquist et al. | 29/450 |
| 4,736,506 | 4/1988 | Hanebrink | 29/235 |

FOREIGN PATENT DOCUMENTS

| | | |
|---|---|---|
| 2857022 | 5/1980 | Fed. Rep. of Germany . |
| 416791 | 5/1910 | France . |
| 2573315A | 5/1986 | France . |
| 630295 | 10/1949 | United Kingdom . |

*Primary Examiner*—P. W. Echols
*Assistant Examiner*—David P. Bryant
*Attorney, Agent, or Firm*—Watts Hoffmann Fisher & Heinke

[57] ABSTRACT

A method of applying a flexible cover to a handle by placing the cover on a mandrel like apparatus, rolling the cover into a toroidal shape and expanding the circumferential dimension of the toroidally shaped cover. Once the circumferential dimension of the toroidally shaped cover is increased, the handle is adjacently placed next to the toroidally shaped cover. The cover is then unrolled onto a preselected area of the handle.

23 Claims, 3 Drawing Sheets

METHOD AND APPARATUS FOR APPLYING A HANDLE COVER

This is a division of Ser. No. 106,247, filed, Oct. 7, 1987, now U.S. Pat. No. 4,941,232.

TECHNICAL FIELD

This invention relates to a covers for handles and more particularly to slip resistant, elastomeric covers constructed to be applied by the user and readily removable for cleaning or replacement, especially suitable for use on meat-cutting knives.

BACKGROUND ART

It is often desirable to apply a cushion-like covering to an otherwise rigid handle of an implement for improved comfort and grip. However, constructions and materials used in existing grips, especially those that can be applied and replaced by the user, are not satisfactory for many applications. In the food industry, in particular, a satisfactory slip-resistant replaceable handle cushion is needed.

Health standards in the food industry, especially the meat butchering and cutting industry, dictate a high degree of cleanliness and cleanability for equipment, including knives and other cutting tools, both hand operated and power driven. As a result, the materials used to fabricate the tools are typically non-porous, such as stainless steel, aluminum, or plastic, to minimize the foci where soil can accumulate. Power-driven hand knives, for example, typically have smooth metal or plastic handles with, perhaps, a small knurled portion to facilitate gripping by the user. The fluids and fats which result from cutting meat or other comestibles lead to slipperiness between the meat-cutter's hand or glove and the cutting tool handle.

Power tools compound the problem of slippage by contributing motor vibrations, sudden torque, and mechanical shock which can jar the tool from the operator's hand. The vibration also causes fatigue and discomfort that makes gripping the tool more difficult. Typically an operator tends to grip a slippery or vibrating tool more firmly by applying more hand pressure which leads, in the short run, to operator fatigue and, in the longer run, to occupational disabilities of the hand and forearm.

DISCLOSURE OF THE INVENTION

The invention is a cutting tool handle cover that improves an operator's grip on the tool, provides cushioning on the handle against shock, and is washable on the handle; yet also is inexpensive and easy to install and remove so it facilitates replacement when worn or permanently soiled. More particularly, the invention provides for an elastomeric covering for a handle constructed to be applied by the user and readily removable for cleaning and replacement. The covering is characterized by a non-slip surface to facilitate hand gripping under moist or oleaginous conditions; resilience sufficient to provide cushion against mechanical shock being transmitted from the handle to the hand during use; reversible adherence to the handle to provide for non-twisting of the cover during use of the handle and further to provide for removal or replacement of the cover after use; elasticity sufficient to provide for dimensional modification of the cover so that it contacts substantially the entire surface of the handle; non-permeability to prevent fluid substances from passing through the cover to the handle; and low thermal conductivity to provide insulation against heat being conducted from the hand to the handle during use.

In one embodiment, the covering is in the form of a thin ribbed sheath; the sheath is applied to the handle by the user by unrolling a rolled-up sheath onto the handle; a fixture to aid in rolling, unrolling and exactly positioning the sheath on the handle is provided. The sheath may be cylindrical, conical or hourglass shaped, depending upon the elasticity and the configuration of the handle to which it is applied.

As used in the specification and the claims, "non-absorbing" means substantially resisting the absorbance of physiological fluids, such as blood and sera, as well as oils and fats; "washable" means amenable to the removal of physiological fluids, oils and fats, and imbedded fleshy or fatty particulates, which may be flushed out and carried away by the application of high pressure water, with or without detergent. "Closed-cell foam" refers to a cellular plastic having non-interconnecting cells open only on end surfaces. "Random and open-cell foam" refers to a cellular plastic having interconnecting cells randomly arranged.

The thin, ribbed sheath is formed by dipping a grooved sheath-form-matrix into liquidified elastomeric material, such as latex. Once the elastomeric material has set, it is stripped off the matrix and turned inside out to form the ribbed sheath. The ribs are, preferably, longitudinally arranged on the cylindrical sheath, have sharp edges to provide for good gripping, and are tapered at the ends so that there are no blunt corners to facilitate cleaning. In a preferred embodiment of the sheath, the ribs are rectilinear in cross-section and have a height of about 1/16 to about 3/16 of an inch. The height of the ribs determines, to an extent, the grip size, so that the larger ribs would be used by an operator with a large hand and the smaller ribs by an operator with a smaller hand. The contoured-wall, ribbed sheath is formed by being cast from a mold having longitudinal ribs. These ribs, like those on the thin, ribbed sheath, preferably have sharp edges to provide for good gripping and are tapered at the ends to facilitate cleaning. The ribs have a height of about 1/16 to ⅛ of an inch. The thickness of the contoured wall can be varied to change the grip size so that thicker walled sheaths would be used by an operator with a larger hand and thinner walled sheaths by an operator with a small hand. The thickness of the wall is preferably no less than about ⅛ of an inch at its thinnest portions to impart sufficient rigidity. The thickness of the wall is greater at the top and bottom of the sheath and greatest in the middle to define an hour-glass shape. Thus at the top and bottom, the wall should have a minimum thickness of about ¼ of an inch and at the middle a thickness of about ⅜ of an inch or more to provide for good gripping depending on the operator's hand size.

In order for the thin, ribbed sheath to be applied to a handle, especially a metallic handle, it is necessary that the sheath be rolled up into a toroid shape and then accurately unrolled onto the handle This is so because the elastomeric nature of the sheath prevents it from being slidable over the handle. It is undesirable to fabricate the thin sheath so that it could be slipped over the handle or to lubricate the thin sheath for application because in either case, the covering would twist during use and present a safety hazard. Thus, once the sheath is on the handle, it adheres and cannot be positionally adjusted. Hence a fixture is provided to aid in application of the sheath so that the sheath is placed in the exactly desired position where it is unrolled onto the handle.

The fixture is proportioned so as to ensure exact placement of the sheath on a handle. The fixture comprises a tubular mandrel and base separable from the mandrel; the mandrel is dimensioned so that a sheath may be fairly easily slipped over it with or without lubrication; the mandrel may also have graduations at the top to aide in positioning of sheaths of different length or different thickness, e.g., a sheath thicker due to higher ribs will have a larger diameter when rolled than a thinner covering of the same length. The base is proportioned so as to accommodate an end of the handle within its circumference. In use, a sheath is slid over the tubular mandrel into a predetermined position on the mandrel, depending on the length or thickness of the sheath; the sheath is rolled from the top down into a toroid or donut shape; the toroid is then rolled onto the base. Once the rolled sheath is positioned on the base, the mandrel is removed; the handle to be covered is placed on the base; and the sheath unrolled onto the handle. Accordingly, there is provided a method of applying a thin, tubular, open-ended elastomeric handle covering of a predetermined length and/or thickness to a preselected area of a handle, the covering having a top-end and a bottom-end, the method being characterized by the steps of rolling the covering into a toroidal shape; placing the toroidally shaped covering in a first predetermined position; placing the handle in a second predetermined position; and unrolling the covering onto the handle; said first and second predetermined positions being located and arranged so that the covering is unrolled onto the preselected area of the handle. Preferably, the toroidally shaped covering is stretched radially prior to being unrolled.

The above and other features and advantages of the invention will become more apparent from the detailed description that follows.

BEST MODE FOR CARRYING OUT THE INVENTION

Figure 1:
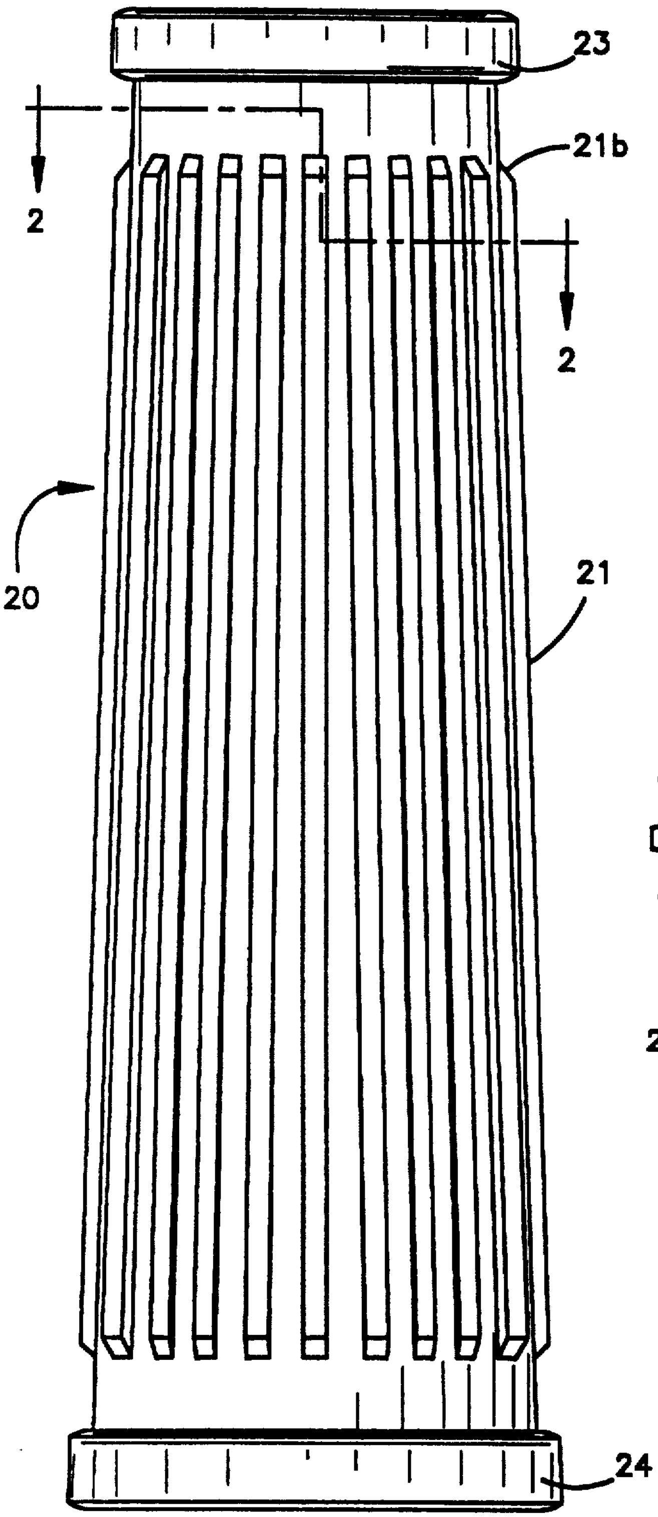
FIG. 1 is an elevational view of the thin, ribbed sheath of the invention.
Figure 2:
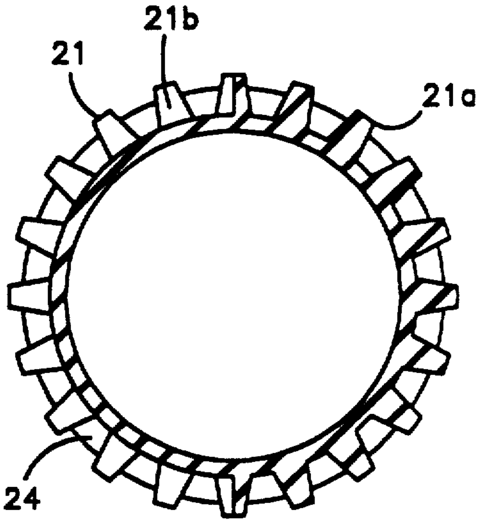
FIG. 2 is a cross-sectional view of FIG. 1 along the line 2—2.

Referring to the drawings, the thin, ribbed sheath of the invention is shown generally at 20 in FIG. 1. The sheath is formed by dipping a grooved sheath-form-matrix into liquified elastomeric material such as Surtex Natural Rubber Latex, which is natural rubber latex, U.S.D.A. approved, and stripping the set latex sheath off the matrix inside out to yield the sheath 20. The grooves on the sheath-form-matrix are longitudinal so as to form longitudinal ribs 21 on the outside of the sheath. The grooves are rectilinear so as to yield sharp edges **21*a* on the ribs 21 to enhance gripping. The ends of the grooves are tapered to yield tapered rib ends as at 21*b* to facilitate cleaning of the sheath. The sheath has a top cuff 23 and a bottom cuff 24** to define the gripping area of the sheath.

Figure 3:
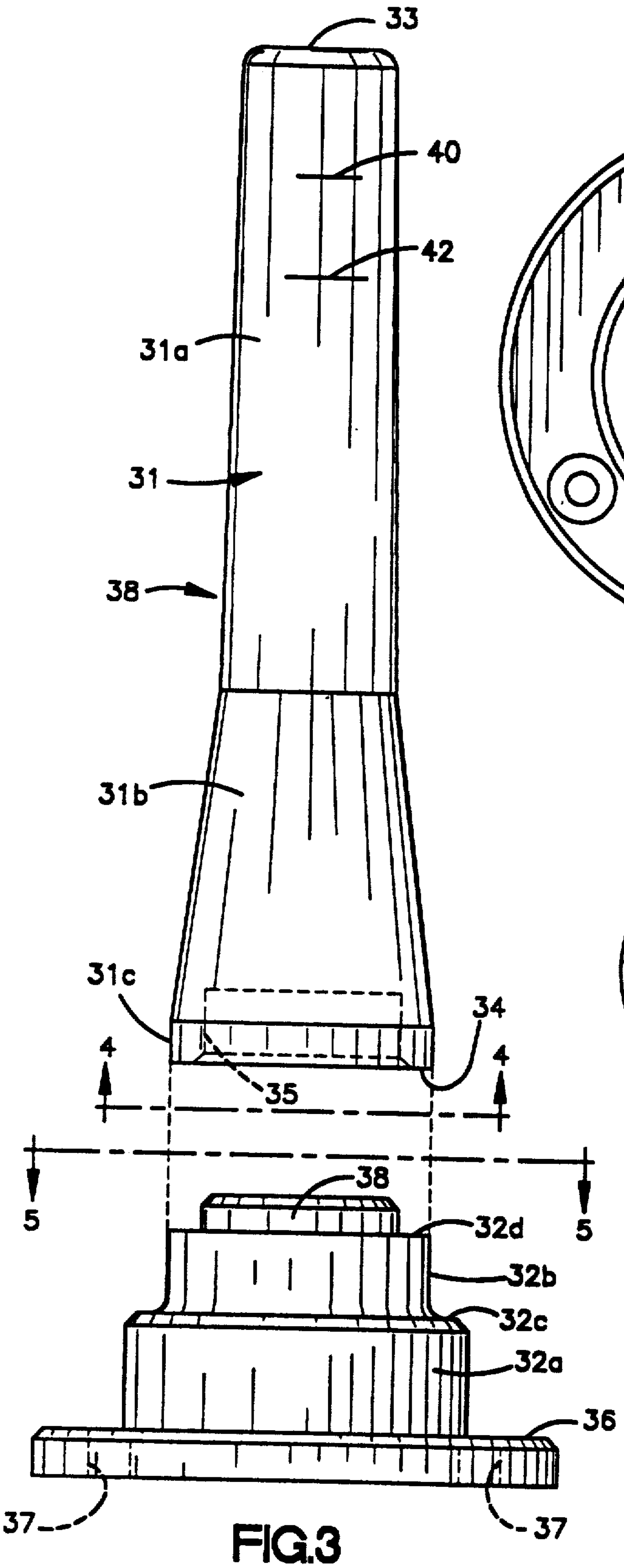
FIG. 3 is an elevational view of the fixture of the invention.
Figure 5:
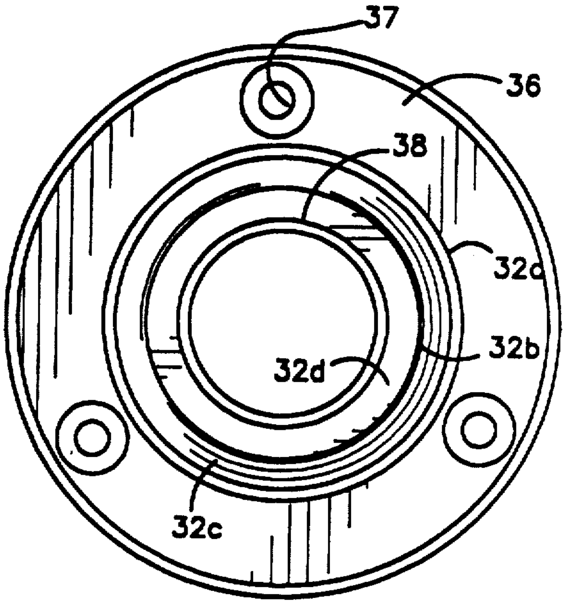
FIG. 5 is a top plan view of a part of the fixture of FIG. 3 taken from the plane 5—5 of FIG. 3.
Figure 4:
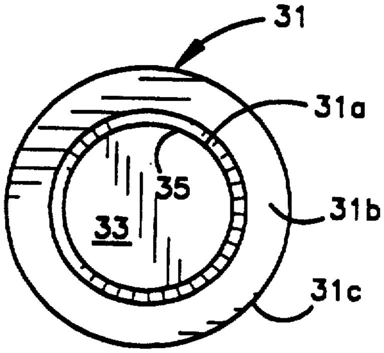
FIG. 4 is a bottom plane view of a part of the fixture of FIG. 3 taken from the plane 4—4 of FIG. 3.

FIG. 3 illustrates a fixture 30 used to roll the sheath of FIG. 1 in preparation for application to a handle. The fixture 30 comprises a mandrel 31 and a base 32. The mandrel is circular in cross section and has a first portion **31*a* that tapers slightly and uniformly, increasing its diameter, from a flat end 33 toward a second portion 31*b*. Portion 31*b* tapers and increases its diameter a greater rate toward a third portion 31*c*, which is cylindrical. The mandrel terminates at a wide end 34, in which a recess 35 is formed. The base 32 has a bottom flange 36 with holes 37 so that the base can be affixed to a work surface by screws or bolts. Atop the bottom flange of the base 32 there is a first columnar portion 32*a* and on top of it a reduced diameter second columnar portion 32*b*. The juncture therebetween defines a rolled-sheath-stopping shoulder 32*c* which prevents the sheath from rolling beyond a predetermined number of turns, as is more fully explained below. A boss 38 extends from the reduced diameter columnar portion 32*b*, dimensioned to be closely received in the recess 35 of the mandrel 31. The juncture between boss 38 and reduced diameter columnar portion 32*b* forms a shoulder 32*d* to engage the annular end 34 of the mandrel 31**.

Figure 6:
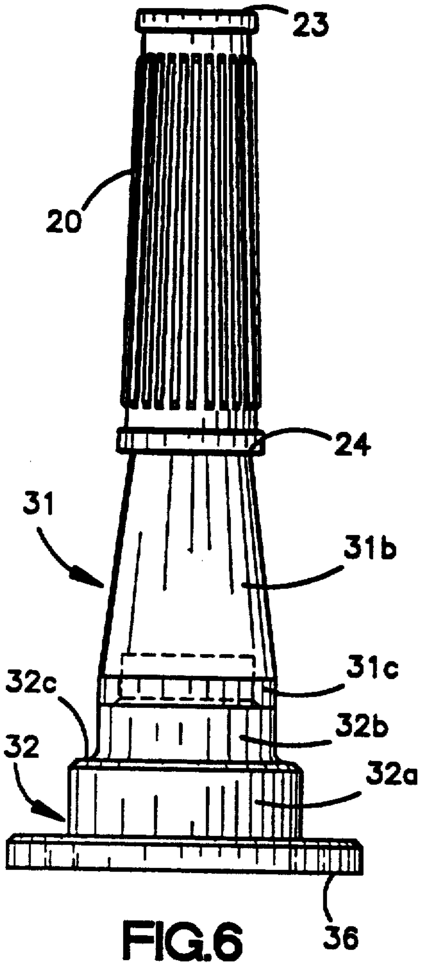
FIG. 6 is an elevational view of the thin, ribbed sheath positioned on the fixture prior to rolling.

FIG. 6 illustrates a sheath 20 that conforms in size and shape to, and which is slipped over the portion **31*a* of the mandrel 31. As illustrated, the top cuff 23 of the sheath 20 is aligned flush with the end 33. Should a thicker or shorter sheath than as illustrated in FIG. 6 be used, the top cuff 23 may be aligned with, e.g., a mark 40 or a mark 42, circumferentially enscribed or otherwise applied on mandrel 31. The distance between the rolled sheath stopping shoulder 32*c* and the tip end 33 or, e.g., mark 40 or mark 42, is predetermined according to the length and thickness of the sheath 20 so that when a particularly sized sheath 20 is rolled down the mandrel 31 until stopped by the rolled sheath stopping shoulder 32*c*, the sheath 20** will have rolled a predetermined number of turns so that it is positioned accurately for unrolling onto a handle.

Figure 7:
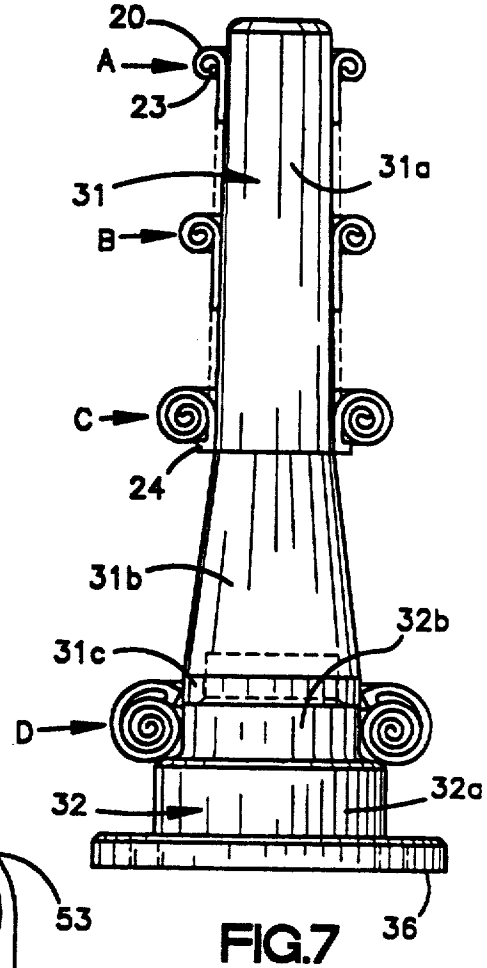
FIG. 7 is a schematic view, partially in cross-section illustrating the method of rolling the thin, ribbed sheath.
Figure 8:
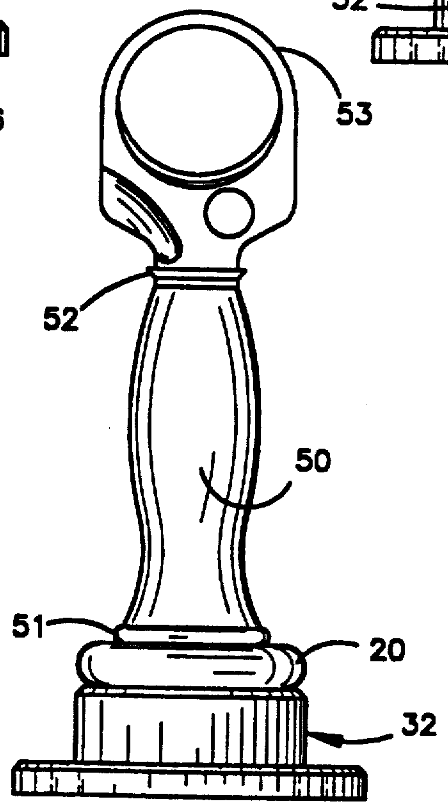
FIG. 8 is an elevational view of the sheath rolled onto the base of the fixture with the mandrel replaced by a knife handle, the sheath being positioned for unrolling onto the handle.

As illustrated diagrammatically in FIG. 7, the top cuff 23 of the sheath 20 is rolled down the fixture 30. Rolling is commenced as illustrated in position A; as rolling continues through position B, the top cuff 23 is enclosed within the rolled-up portion of the sheath; at position C, the sheath 20 is completely toroidal, with the bottom cuff 24 still against the surface of the mandrel. At that point the mandrel gradually expands in diameter. Further rolling of the sheath 20 down the mandrel 31 toward and onto the column portion **32*b* and against the shoulder 32*c* stretches the rolled sheath radially and is carried out so as to position the toroidal sheath with the bottom cuff 24 located as illustrated in position D, exactly at the top of portion 32*b* of the base. The radial stretching is necessary because the sheath must be in a radially stretched condition when applied to the handle to prevent subsequent slippage. When the rolled-up sheath is in position D on the base, the mandrel 31 is removed from the base and replaced by a handle, e.g., a knife handle 50, as illustrated in FIG. 8. The column portion 32*b* is essentially the same diameter and shape as the outside diameter of the base of the handle, and the boss 38 is constructed to fit closely within the base of the knife handle. A bottom end 51 of the knife handle rests on the shoulder 32*d* of the base. The bottom cuff 24, not visible in FIG. 8, is located essentially flush with the bottom 51 of the handle 50. The rolled sheath 20 is then unrolled upward so as to be placed in the exactly desired position between the bottom 51 and the top 52 of the handle 50**. As previously mentioned, this arrangement is necessary because the sheath cannot be positionally adjusted once it is rolled onto the handle.

As illustrated in FIG. 8, the knife handle 50 is placed on the base 32 of the Fixture 30 so that the sheath 20 will be unrolled toward the blade end 53. This arrangement is used when the knife is of the electric motor driven type having a hollow handle 50 adapted to removably receive a drive cable. Knives of this type are shown, e.g., in U.S. Pat. No. 4,439,924. With an air motor driven knife the drive is not conveniently removable, but the blade end 53 can be made removable from the handle 50; and in that case the base 32 can be dimensioned to receive the top 52 of the handle 50. The sheath 20 is then rolled onto the handle in the direction starting at the top 52 rather than the bottom 51, as described above.

Although the sheath 20 and fixture 30 are illustrated in FIG. 8 as adapted for a somewhat tapered handle, or an hourglass shaped handle as in FIG. 8, the sheath 20 and fixture 30 can be constructed and arranged for other shapes, such as cylindrical. Where the handle is placed on the mandrel in an inverted position, the shape of the mandrel and/or the sheath may require modification, but within reasonable limits, the sheath will stretch and contract to accommodate variations.

With an appropriate hollow handle of the article to which the sheath is to be applied, the mandrel 31 need not be separable from the base 32; e.g., if the knife or other tool construction is hollow and thin walled over the length to which this cover is to be applied. In that case, the mandrel can be shaped so that when the sheath 20 is rolled to a position against the shoulder **32*c*, the hollow handle can be simply slipped over the mandrel 31** and stopped by a handle stopping portion on the mandrel, formed by, e.g., a increased diameter portion on the mandrel beyond which the handle will not pass, but past which the sheath can be rolled.

From the foregoing description of the preferred embodiments of the invention it will be apparent that the advantages of the invention heretofore enumerated and others have been accomplished and that there has been provided a slip-resistant, cushioning covering for a handle. While preferred embodiments of the invention have been described in considerable detail, various modifications or alterations may be made therein without departing from the spirit or scope of the invention set forth in the appended claims.

We claim:

1. A method of applying a preformed, thin, tubular, elastomeric handle cover of a predetermined length and thickness to a preselected area of a handle adjacent a butt end thereof, the cover having a first end and a second end, both of which are open, the method comprising the steps of:

manually placing said thin, tubular, elastomeric cover onto a fixture between first and second ends of the fixture, the placement of the first end of the cover being near the first end of the fixture and the second end of the cover being near the second end of the fixture;

rolling said thin, tubular, elastomeric cover on the fixture from the first end of the cover into a toroidal shape;

locating the toroidally shaped cover on the fixture with the second end of the cover in a first predetermined position;

thereafter placing the handle in a second predetermined position with a butt end of the handle directly adjacent the second end of the cover; and unrolling the cover onto the handle from the first predetermined position;

said first and second predetermined positions being located and arranged so that the cover is unrolled onto the preselected area of the handle, with the second end of the cover located at the butt end of the handle.

2. The method of claim 1 further characterized in that the step of rolling the tubular cover into a toroidal shape is carried out by placing the tubular cover on a fixture that is longer than and fits within the cover and positioning the cover with the first end at a predetermined location on the fixture adjacent the first end of the fixture, the predetermined location being determined by the relationship between the length and thickness of the cover and the length of the fixture.

3. The method of claim 1 further characterized in that the step of placing the handle in a second predetermined position is carried out by placing the butt end of the handle on the fixture so that the butt end of the handle is adjacent to the second end of the cover.

4. The method of claim 1 further characterized by transferring the toroidally shaped cover to a handle support portion of said fixture from which the cover is unrolled.

5. The method of claim 4 further characterized in that the step of placing the handle in a second pre-determined position is carried out by placing the butt end of the handle on the handle support portion of said fixture so that the butt end of the handle is adjacent to the second end of the cover.

6. A method of applying a thin, tubular, open-ended elastomeric handle cover of a predetermined length and thickness to a preselected area of a handle, the cover having a first end and a second end, comprising the steps of:

placing the cover on a fixture having a plurality of sections with the first cover end at a predetermined location on a first fixture section, the predetermined location being related to the length and thickness of the cover and the distance between the first cover end and a second fixture section so the cover can be unrolled from the fixture directly onto a handle with the second cover end located directly at a butt end of the handle;

rolling the cover from teh first end into a toroidal shape on the first fixture section, said toroidal shape being one in which the second end of the cover is on the surface of the shape;

rolling and stretching the toroidally shaped cover from the first fixture section to the second fixture section to expand the diameter of the shape and to position the second end of the toroidally shaped cover in a first predetermined position on the second fixture section;

placing the butt end of a handle adjacent the second fixture section so that the butt end of the handle and the second end of the cover are juxtaposed; and, unrolling the cover from the fixture onto the handle so that the cover is unrolled second area first directly onto the butt end of the handle.

7. A method of improving the grip of a hand tool having a contoured handle characterized by the steps of:

providing a thin, tubular, open-ended, elastomeric handle cover of a predetermined length and thickness;

placing said cover onto a fixture, the fixture having first and second ends;

rolling the cover on the fixture from a first end of the cover toward a second end into a toroidal shape so the second end of the cover is on the surface of the shape;

rolling the toroidally shaped cover on said fixture to place the second end of the cover in a first predetermined position on the fixture;

placing the handle in a second predetermined position adjacent the fixture to receive the cover; and unrolling the cover from the fixture onto the handle;

said first and second predetermined positions being located and arranged so that the cover is unrolled onto a preselected area of the handle.

8. The method of claim 7 further characterized in that the step of rolling the cover into a toroidal shape is carried out by placing the cover on a fixture with the first end of the cover at a third predetermined location on the fixture, the third predetermined location being determined by the relationship between the length and thickness of the cover and the length of the fixture.

9. The method of claim 7 further characterized in that the step of placing the handle in a second predetermined position is carried out by placing one end of the handle on the fixture so that the end of the handle is adjacent to the second end of the cover.

10. The method of claim 7 further characterized by transferring the cover to a handle support portion of said fixture adjacent the fixture second end and unrolling the cover from the handle support portion onto the handle.

11. The method of claim 10 further characterized in that the step of placing the handle in a second pre-determined position is carried out by placing the butt end of the handle on the handle support portion of said fixture so that the butt end of the handle is adjacent to the second end of the cover.

12. The method of improving the grip of a hand tool having a contoured handle comprising the steps of:

providing, a thin, tubular, elastomeric handle cover of a predetermined length and thickness, the cover having a first end and a second end;

manually placing the cover on a fixture having first and second ends;

rolling the cover from the first end into a toroidal shape on the fixture;

rolling and stretching the toroidally shaped cover on the fixture to expand the toroidal shape and to place the toroidally shaped cover in a first predetermined position on the fixture;

placing the handle in a second predetermined position on the fixture so that one end of the handle and the second end of the cover are juxtaposed; and unrolling the cover from the fixture onto the handle.

13. A method of applying a thin, tubular, tapered elastomeric handle cover of a predetermined length and thickness to a preselected area of a handle, the cover having a first end and a second end, both of which are open, the first end having a smaller circumferential dimension than the second end, the method comprising the steps of:

manually placing the cover onto an elongated mandrel consisting of three contiguous portions that together are longer than the elastomeric cover, the first mandrel portion being tapered from a first end of circumferential dimension less than the circumferential dimension of the first end of the elastomeric cover to a second end of circumferential dimension at least equal to the circumferential dimension of the second end of the elastomeric cover;

the second tapered mandrel portion expanding in circumferential dimension from the circumferential dimension of the second end of the elastomeric cover to a circumferential dimension greater than or equal to that of a handle to which the cover is to be applied;

the third mandrel portion having a holding surface of circumferential dimension and shape corresponding substantially to the circumferential dimension and shape of an end of a handle to which the elastomeric handle cover is to be applied;

rolling the first end of the cover along the first portion of the mandrel toward the second end thereof, into a toroidal shape;

rolling the toroidal shape a predetermined number of revolutions onto and along the second portion of the mandrel to expand the circumferential dimension of the toroidal shape to that of the third mandrel portion holding surface;

rolling the elastomeric toroidal shape from the second mandrel portion to the third mandrel portion and positioning the elastomeric toroidal shape on the holding surface of the third mandrel portion at a location adjacent the second mandrel portion, with the second end of the elastomeric cover adjacent the second mandrel portion;

placing one end of a handle at the holding surface, near the second end of the elastomeric toroidally shaped cover; and unrolling the cover from the holding surface of the third mandrel portion onto and along the handle away from the third mandrel portion, with the second end of the elastomeric handle cover accurately located at said one end of the handle.

14. The method as set forth in claim 13 wherein the handle is tubular and fits over the first and second mandrel portion but not over the third, and including the step of placing the tubular handle over the first and second mandrel portions after the cover is rolled onto the third mandrel portion.

15. The method of claim 13 wherein the mandrel is separable between the second and third mandrel portions, and including the steps of:

separating the mandrel after the cover is rolled onto the third mandrel portion and then placing one end of a handle at the holding surface.

16. The method as set forth in claim 13 including the step of effectively restraining the toroidally shaped cover on the holding surface of the third mandrel portion against movement that would carry the second end of the cover beyond the junction between the second and third mandrel portions.

17. The method as set forth in claim 13 including the step of positioning the elastomeric handle cover with the first end at a predetermined location on the first portion of the mandrel, the predetermined location being so related to the length of the second mandrel portion that the second end of the cover will necessarily be located at the junction between the second and third mandrel portions when the cover is rolled onto the third mandrel portion.

18. The method of claim 17 further characterized in that placing said handle at the holding surface of the third mandrel portion is carried out by:

separating the first and second mandrel portions from the third after the cover is rolled onto the third mandrel portion and then placing one end of a handle at the holding surface.

19. A method of applying a thin, tubular, open-ended elastomeric handle cover of a predetermined length and thickness to a preselected area of a handle, the cover having a first end and a second end, both of which are open, comprising the steps of:

placing the cover on a fixture with the first end of a predetermined location on the fixture;

rolling the elastomeric cover first end forward into a toroidal shape on the fixture;

rolling and stretching the toroidally shaped cover on the fixture to expand the diameter of the toroidal shape and placing the toroidally shaped cover in a first predetermined position on the fixture;

placing a handle in a second predetermined position on the fixture so that one end of the handle and the second end of the cover are juxtaposed; and unrolling the toroidally shaped covering from the fixture onto the handle, the first and second predetermined positions being located and arranged so that the covering is rolled onto the preselected area of the handle.

20. A method of applying a thin, tubular, open-ended elastomeric handle cover of a predetermined length and thickness to a preselected area of a handle, the cover having a first end and a second end, both of which are open, comprising the steps of:

manually placing the cover onto a tapered fixture, longer than the cover and having longitudinally successive, first, second and third portions;

the first portion being at least as long as the cover, having a first end of circumferential dimension less than that of the cover, and expanding in circumferential dimension to be equal to or greater than the circumferential dimension of the cover;

the second portion having a first end and a second end, tapered between to gradually increase the circumferential dimension of the second portion over a predetermined length;

the third portion having a circumferential dimension equal to the maximum circumferential dimension of the second portion, and consisting of a holding surface having a first and second end, and corresponding essentially to the circumferential dimension of a handle;

manually placing the cover onto the first portion of the fixture, positioning the first end of the cover at a predetermined location;

rolling the first end of the cover toward the second end, longitudinally along the first portion into a toroidal shape;

rolling the toroidally shape onto and along the second portion to increase the circumferential dimension of the toroidal shape to equal the circumferential dimension of the third portion holding surface;

rolling the toroidal shape from the second portion to the third portion holding surface;

positioning the second end of the cover at the first end of the third portion holding surface;

placing a handle over the first and second portions so that the handle end is directly adjacent to the first end of the third portion holding surface with the second end of the toroidally shape cover resting at its predetermined position; and unrolling the tubular elastomeric cover from a toroidal shape into a tubular shape, along the handle so that the second end of the cover rests at the handle end with the cover enveloping the handle.

21. Apparatus for applying a cover to a handle, comprising a base and a separable mandrel, said mandrel having a first portion constructed to receive a flexible, stretchable, tubular cover that is open at opposite ends, and a second portion that is tapered and expands in diameter from said first portion toward said base, said base having a portion that abuts the mandrel to receive a cover rolled from the mandrel onto the base, means spaced from the mandrel-abutting portion for restricting cover movement on the base to a distance substantially equal to the thickness of the rolled cover, means to locate the mandrel, and, when the mandrel is removed, to locate a handle in place of the mandrel.

22. Apparatus for applying a flexible, stretchable, tubular, elastomeric handle cover that is open at opposite ends to a handle, said apparatus comprising a base and a mandrel, said mandrel having a first portion constructed to receive the cover, the first portion being longer than the cover, a second portion that is tapered and expands in diameter from said first portion toward the base, the base having a portion with a circumferential dimension and shape substantially equal to that of a butt end of the handle and that abuts the second portion of the mandrel to receive the cover when the cover is rolled into a toroidal shape and rolled down the mandrel and onto the base, means spaced from the mandrel-abutting portion for restricting cover movement on the base to a distance substantially equal to the thickness of the toroidal shape and means to locate the handle on the base portion in the same relationship therewith as the mandrel so that the cover can be unrolled from the base directly onto the handle.

23. The apparatus of claim 22 wherein the mandrel is removable from the base.

* * * * *

UNITED STATES PATENT AND TRADEMARK OFFICE
CERTIFICATE OF CORRECTION

PATENT NO. : 5,074,023
DATED : December 24, 1991
INVENTOR(S) : Richard B. Decker It is certified that error appears in the above-identified patent and that said Letters Patent is hereby corrected as shown below:

Title page, delete Joseph Hummel as inventor.

Column 3, line 56 after "sheath," insert --and--.

Column 6, line 59 delete "teh" and insert --the--.

Signed and Sealed this

Seventeenth Day of August, 1993

Attest:

BRUCE LEHMAN

Attesting Officer

*Commissioner of Patents and Trademarks*